United States Patent [19]

Kimura et al.

[11] Patent Number: 5,155,407
[45] Date of Patent: Oct. 13, 1992

[54] VIBRATION DRIVEN APPARATUS

[75] Inventors: Atsushi Kimura, Yokohama; Hiroyuki Seki, Urawa; Takashi Maeno, Yokohama, all of Japan

[73] Assignee: Canon Kabushiki Kaisha, Tokyo, Japan

[21] Appl. No.: 623,571

[22] Filed: Dec. 7, 1990

[30] Foreign Application Priority Data

Dec. 8, 1989 [JP] Japan .................................. 1-320127

[51] Int. Cl.⁵ ........................................... H01L 41/08
[52] U.S. Cl. .................................................... 310/323
[58] Field of Search ................................. 310/323, 328

[56] References Cited

U.S. PATENT DOCUMENTS

| | | | |
|---|---|---|---|
| 4,580,073 | 4/1986 | Okumura et al. | 310/323 |
| 4,672,256 | 6/1987 | Okuno et al. | 310/323 |
| 4,692,652 | 9/1987 | Seki et al. | 310/323 |
| 4,723,129 | 2/1988 | Endo et al. | 346/1.1 |
| 4,740,796 | 4/1988 | Endo et al. | 346/1.1 |
| 4,978,882 | 12/1990 | Kitani | 310/328 |

FOREIGN PATENT DOCUMENTS

| | | |
|---|---|---|
| 0169297 | 1/1986 | European Pat. Off. . |
| 0301430 | 2/1989 | European Pat. Off. . |
| 3415628 | 10/1984 | Fed. Rep. of Germany . |
| 60-046781 | 3/1985 | Japan . |
| 0018371 | 1/1986 | Japan ............ 310/323 |
| 0224880 | 10/1986 | Japan ............ 310/323 |
| 62-077968 | 9/1987 | Japan . |
| 62-077969 | 10/1987 | Japan . |
| 0213480 | 9/1988 | Japan ............ 310/323 |
| 0294273 | 11/1988 | Japan ............ 310/323 |
| 0117669 | 5/1989 | Japan ............ 310/323 |
| 0126180 | 5/1989 | Japan ............ 310/323 |
| 0268465 | 10/1989 | Japan ............ 310/323 |
| 0321879 | 12/1989 | Japan ............ 310/323 |
| 2174554A | 11/1986 | United Kingdom . |

Primary Examiner—Mark O. Budd
Attorney, Agent, or Firm—Fitzpatrick, Cella, Harper & Scinto

[57] ABSTRACT

In a vibration wave driven motor having a vibration member having an electro-mechanical energy conversion element secured to one surface of a resilient member of an elliptical shape formed by straight portions and arcuate portions, and a member brought into pressure contact with the other surface of the resilient member and wherein AC voltages having a phase difference of 90° therebetween in terms of time are applied to the driving phases of the electro-mechanical energy conversion element divided into two phases to thereby generate a travelling vibration wave in the resilient member, whereby the vibration member and the member brought into pressure contact therewith are moved relative to each other, the two driving phases of the electro-mechanical energy conversion element are polarization-processed in such a manner that only one travelling wave is formed in the straight portions of the resilient member.

22 Claims, 6 Drawing Sheets

DEVIATION

DEVIATION

1. −1
2. −0.8
3. −0.6
4. −0.4
5. −0.2
6. 0
7. 0.2
8. 0.4
9. 0.6
10. 0.8
11. 1

VIBRATION DRIVEN APPARATUS

BACKGROUND OF THE INVENTION

1. Field of the Invention

This invention relates to a vibration wave driven motor in which a resilient member in which a travelling vibration wave is generated is formed into an elliptical annular shape, i.e., a so-called track-like shape.

2. Related Background Art

There has heretofore been proposed a vibration wave driven motor in which a travelling vibration wave is formed in a metallic resilient member of an elliptical annular shape comprising straight portions and arcuate portions and wherein for example, the resilient member is constructed as a movable member and the straight portions thereof are brought into pressure contact with a rail-like stator forming the fixed side and the resilient member is rectilinearly moved on said rail-like stator.

Figure 5:
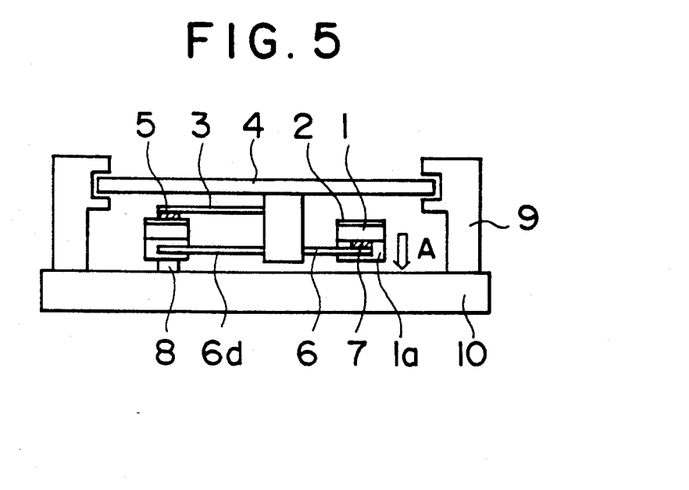
FIGS. 5 and 6 are a side view and a plan view, respectively, of a vibration wave driven motor according to the prior art.
Figure 6:
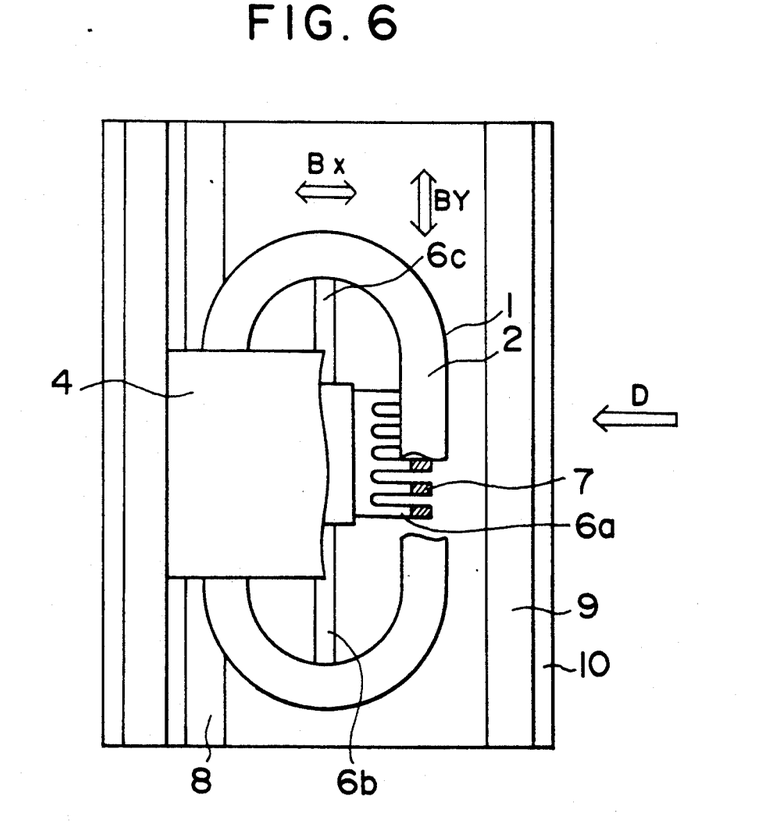

FIGS. 5 and 6 of the accompanying drawings show the construction of such vibration wave driven motor. The reference numeral 1 designates a resilient member having a projection 1a provided on the sliding surface side thereof. A piezo-electric element 2 for forming a travelling vibration wave in the resilient member 1 is joined to the upper surface of the resilient member. The reference numeral 8 denotes a rail-like stator (a driven member) as a contact member which frictionally contacts with the resilient member 1. The rail-like stator 8 is brought into pressure contact with the resilient member 1 by a pressing spring 3 through a vibration insulating material 5 (for example, felt).

The reference numeral 6 designates a comb-tooth-like movement stopper having its comb-tooth portion 6a inserted in a slit in that portion of the resilient member 1 which is not in contact with the rail-like stator 8. The comb-tooth portion 6a supports the resilient member 1 through felt 7 disposed on the bottom of the slit.

The resilient member 1 is supported by a supporting table 4 through the movement stopper 6, the pressing spring 3, etc., and the supporting table 4 on which for example, the printing head of a printer is placed is supported by a restraining member 9 for restraining displacement in any other direction than a direction B$y$ which is a predetermined movement direction.

When a travelling vibration wave is formed in the resilient member 1 by two standing waves which deviate by 90° in phase and time from each other, the resilient member 1 is moved on the rail-like stator 8 by the frictional force between the rail-like stator 8 and resilient member 1 and the supporting table 4 and other members (3, 5, 6 and 7) move along therewith, in the direction B$y$ along the restraining member 9. At that time, the frictional driving force produced acts on a portion of the resilient member 1, and since it deviates from the supporting portion, a moment acts on the resilient member 1, which thus tries to deviate in directions B$x$ and B$y$.

The comb-tooth portion 6a of the movement stopper 6 is inserted in the slit portion of the resilient member 1 as shown in FIG. 6, and restrains the displacement of the resilient member 1 in the direction B$y$ and also supports the weight of the resilient member 1 through the felt 7. Restraining portions 6b and 6c restrain the displacement of the resilient member 1 in the direction B$x$, and a restraining member 6d restrains the displacement of the resilient member 1 on the pressed side thereof in the direction B$y$. By virtue of these members 6a-6d, the resilient member 1 is rectilinearly smoothly movable with the supporting table 4 without back-lash.

Figure 7:
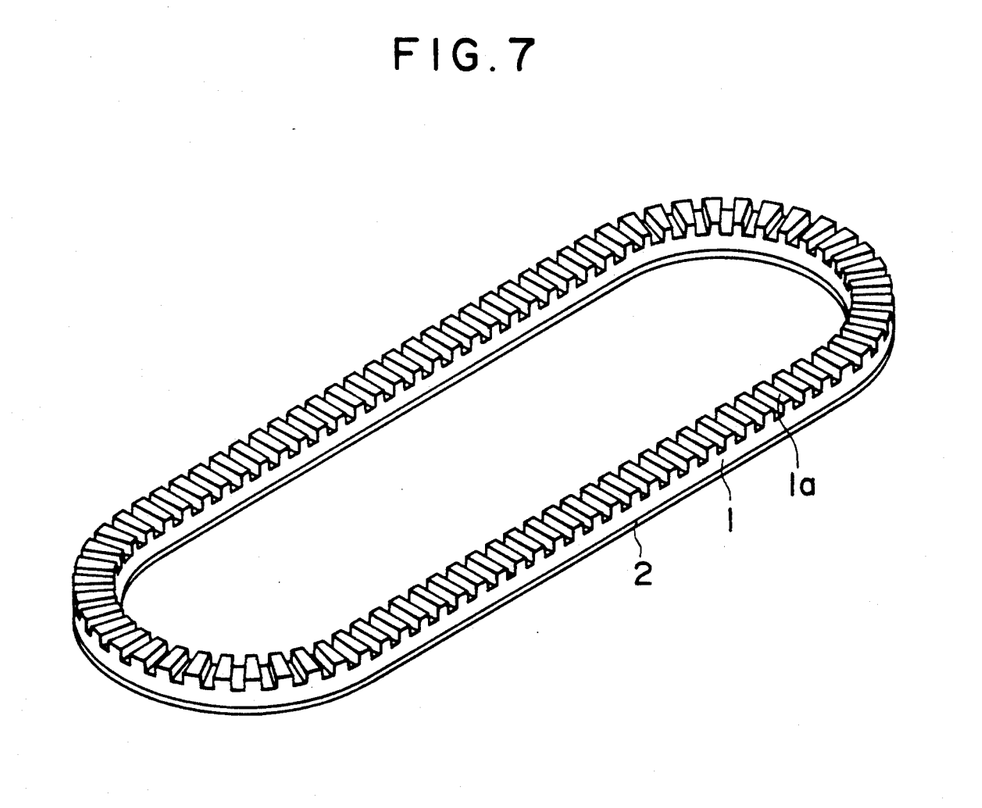
FIG. 7 is a perspective view of a vibration member according to the prior art.
Figure 8:
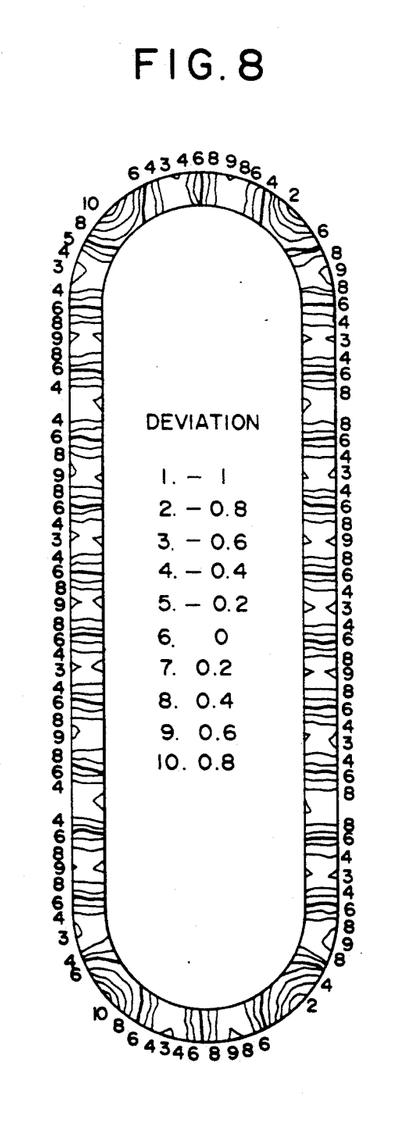
FIGS. 8 and 9 are contour maps of the deviation of two standing wave modes excited in the resilient member of FIG. 7.
Figure 9:
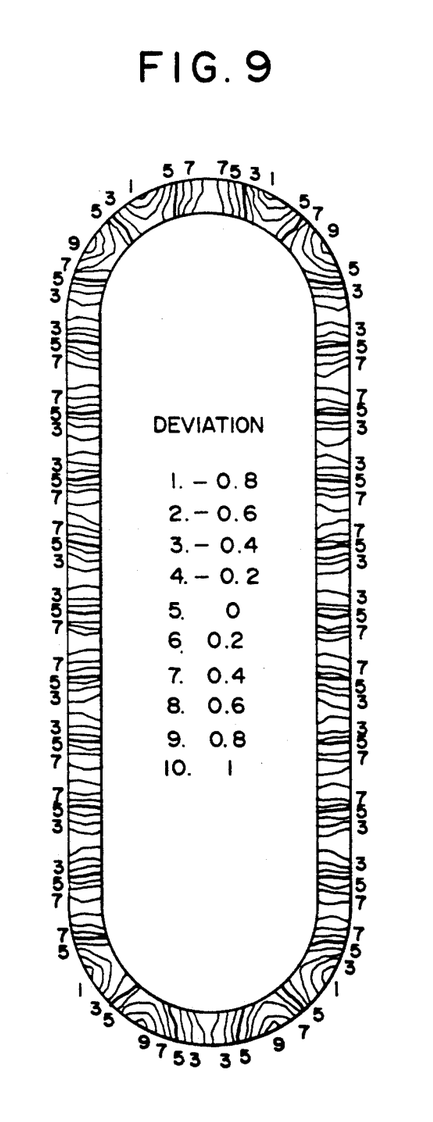

FIG. 7 of the accompanying drawings is a perspective view of the resilient member 1 to which the piezo-electric element 2 is joined, and FIGS. 8 and 9 of the accompanying drawings are contour maps showing the deviations of the surface of the piezo-electric element in two standing wave modes positionally deviating by 90° from each other and equal in resonance frequency which have been found by eigen value analysis using the finite element method. The deviation is a component in a direction perpendicular to the surface of the piezo-electric element, and the amount of deviation is maximum "1".

This vibration member is such that fifteen waves are generated in the full circumference thereof and about five waves are generated in the straight portions thereof used for driving. Accordingly, the rail-like stator 8 and the resilient member 1 are in contact with each other at the antinodes of five waves.

Now, generally, the travelling vibration wave generated in the resilient member 1 is irregular in the magnitude of amplitude from location to location because of the warp of the surfaces of the resilient member 1 and the piezo-electric element 2 and the non-uniformity of the materials thereof. Therefore, where the resilient member 1 and the rail-like stator 8 are in contact with each other at the antinodes of a number of waves, the states of contact in the individual waves differ and in an extreme case, the two members are in contact with each other at some locations and are not in contact with each other at other locations. This irregularity of contact has increased the slide loss on the sliding surface, has reduced the efficiency of the motor and has caused noise.

SUMMARY OF THE INVENTION

It is an object of the present invention to provide a vibration wave driven apparatus in which any reduction in the efficiency of a motor and the generation of noise can be prevented.

It is another object of the present invention to provide a vibration wave driven motor in which a resilient member can be driven while being maintained in stable contact with a rail-like stator and any reduction in the efficiency of the motor and the generation of noise can be prevented.

Other objects of the present invention will become apparent from the following detailed description.

The gist of the present invention for achieving the above objects resides in a vibration wave driven motor having a vibration member having an electromechanical energy conversion element secured to one surface of a resilient member of an elliptical annular shape formed by straight portions and arcuate portions, and a member brought into pressure contact with the other surface of said resilient member and wherein AC voltages having a phase difference of 90° therebetween in terms of time are applied to the driving phases of said electromechanical energy conversion element divided into two phases to thereby generate a travelling vibration wave in said resilient member, whereby said vibration member and said member brought into pressure contact therewith are moved relative to each other, characterized in that the two driving phases of said electro-mechanical energy conversion element are polarization-processed in such a manner that only one travelling wave is formed in the straight portions of said resilient member.

BRIEF DESCRIPTION OF THE DRAWINGS

FIGS. 1 to 4 show an embodiment of a vibration wave driven motor according to the present invention.

DESCRIPTION OF THE PREFERRED EMBODIMENTS

FIGS. 1 to 4 schematically show the essential portions of a bubble jet type printer to which the present invention is applied. The other portions of the printer are identical in construction to those shown in FIGS. 5 and 6 and therefore are not shown. The bubble jet type printer is a printer as disclosed, for example, in U.S. Pat. No. 4,723,129 or U.S. Pat. No. 4,740,796. Briefly describing it, it is a printer of the type in which at least one driving signal corresponding to recording information and providing a rapid temperature rise exceeding nuleate boiling is applied to an electrothermal conversion member diposed correspondingly to a sheet or a liquid path in which liquid (ink) is retained to thereby generate heat energy in the electro-thermal conversion member and cause film boiling on the heat-acting surface of a recording head, with a result that a bubble in the liquid (ink) is formed correspondingly to said driving signal and by the growth and contraction of this bubble, the liquid (ink) is discharged through a discharge opening to form at least one droplet, which is blown against a sheet to thereby form a character.

Figure 1:
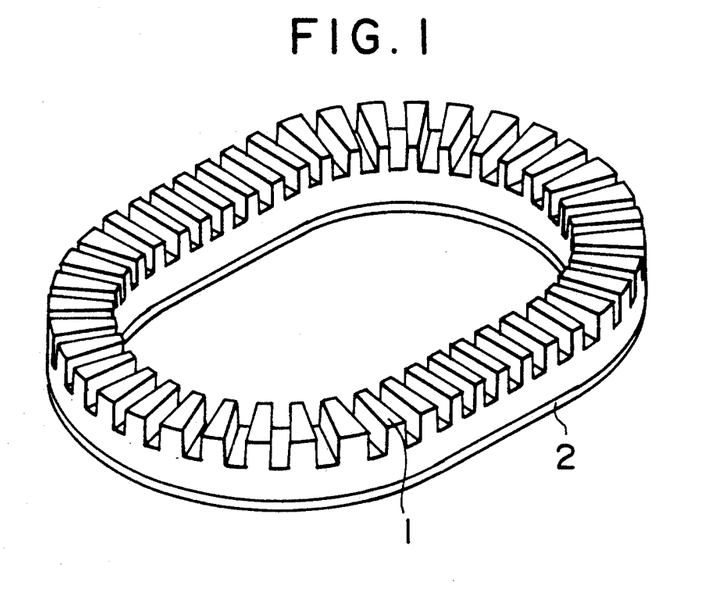
FIG. 1 is a perspective view of a vibration member.

In FIG. 1, the reference numeral 1 designates a resilient member formed into an elliptical annular shape. A piezo-electric element 2 as an electromechanical energy conversion element is adhesively secured to one surface of the resilient member 1, whereby a vibration member is constructed. The present embodiment is such that six travelling vibration waves are formed in the full circumference of the resilient member 1, and the polarization pattern of the piezo-electric element 2 is shown in FIG. 4. The reference characters $2a_1$ and $2a_2$ denote the segment of the piezo-electric element which form one driving phase (hereinafter referred to as the A group) polarization-processed into the (+) polarity and the (−) polarity, respectively. These segments $2a_1$ and $2a_2$ of the piezo-electric element are disposed as shown in a positional phase difference of $\lambda/2$ therebetween ( $\lambda$ being the wavelength of the vibration wave). The reference characters $2b_1$ and $2b_2$ designate the segments of the piezo-electric element which form the other driving phase (hereinafter referred to as the B group) polarization-processed into the (+) polarity and the (−) polarity, respectively. These segments $2b_1$ and $2b_2$ of the piezo-electric element are disposed as shown with a positional phase difference of $\lambda/2$ therebetween. The A group and the B group are disposed with a positional deviation of $\lambda/4$ therebetween. The polarization pattern shown in FIG. 4 is such that in the A group, only one set of piezo-electric elements $2a_1$ and $2a_2$ are disposed for one straight portion of the resilient member 1 and in the B group as well, only one set of piezo-electric elements $2b_1$ and $2b_2$ are disposed for the other straight portion of the resilient member 1, whereby among the six travelling waves over the full circumference, only one travelling wave is formed in each straight portion. AC voltages which are equal in frequency and 90° out of phase with each other in terms of time are applied to the A group and the B group from a driving circuit, not shown, whereby travelling waves are formed on the resilient member 1, and the standing wave mode during the A group driving is shown in FIG. 2 and the standing wave mode during the B group driving is shown in FIG. 3.

Figure 2:
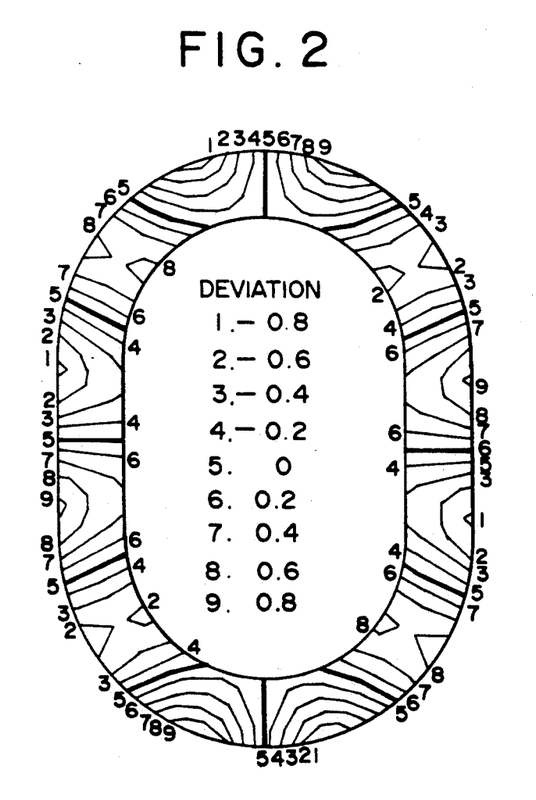
FIG. 2 and 3 are contour maps of the deviation of the standing wave mode by the finite element method.
Figure 3:
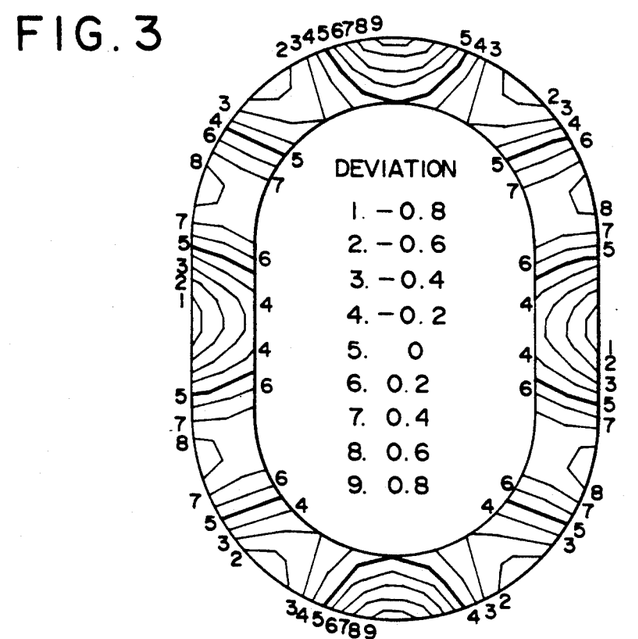
Figure 4:
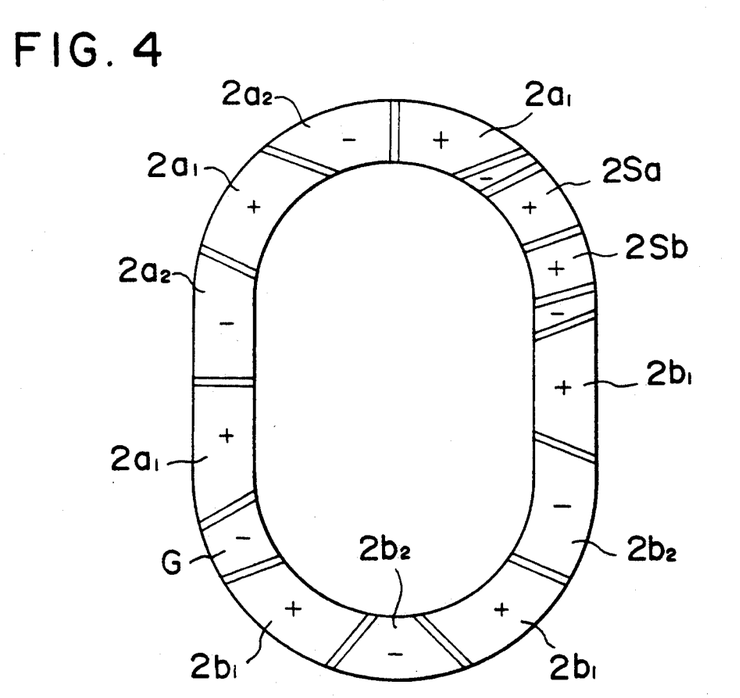
FIG. 4 shows the polarization pattern of a piezo-electric element.

FIGS. 2 and 3 show the deviations of the respective standing wave modes in contour maps in the same manner as FIGS. 8 and 9.

In the present embodiment, the length L of the straight portions is 7 mm and the average radius R of the arcuate portions (the average of the radius of the outer periphery and the radius of the inner periphery) is 5 mm in order to obtain the vibration modes shown in FIGS. 2 and 3, and by the inventor's experiment, it has been found that if the ratio (R/L) of the average radius R of the arcuate portions to the length L of the straight portions is ¼ or more, the position of the maximum amplitude of the standing wave in the straight portions of the resilient member 1 exists on only one of the inner periphery side and the outer periphery side in both of the two vibration modes and when the vibration is made into a travelling wave, the amplitude on one of the outer periphery side and the inner periphery side is always high in the straight portions. In the present embodiment, one travelling wave formed on the straight portions of the resilient member 1 is higher in the amplitude on the outer periphery side. From this, in the case as shown, for example, in FIG. 5, the outer periphery side of the resilient member 1 can be brought into pressure contact with the rail-like stator 8 to thereby drive the motor efficiently.

Thus, the travelling wave formed on the resilient member 1 is such that only one wave is formed in the straight portions and therefore, if such resilient member is applied to the apparatus shown in FIG. 5, the resilient member 1 and the rail-like stator 8 always contact with each other at the antinode of one wave without separating from each other and therefore, the reduction in the efficiency of the motor caused by the slide loss on the sliding surface can be decreased and at the same time, the generation of noise can be prevented.

Figure 10:
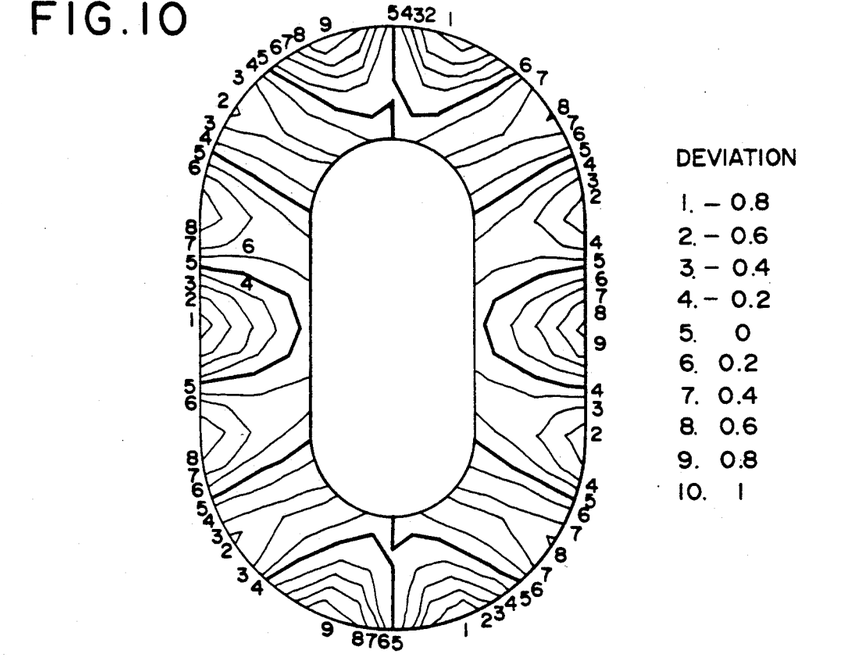
FIGS. 10 and 11 are contour maps of the deviation of the standing wave mode in another embodiment of the present invention.
Figure 11:
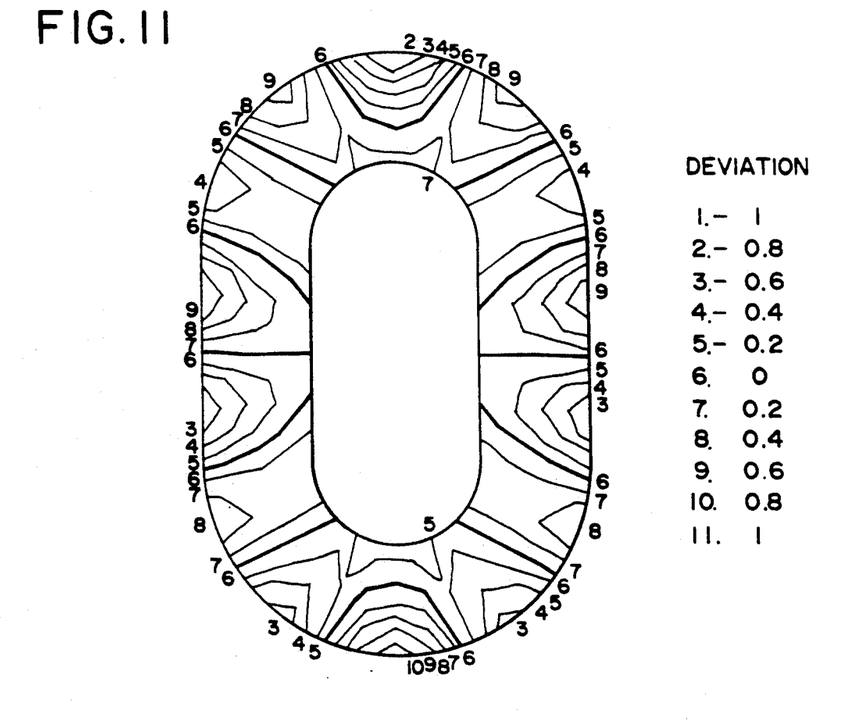

FIGS. 10 and 11 are contour maps of the deviations of the two standing wave modes of the resilient member 1 according to another embodiment of the present invention. This is seven waves over the full circumference, and approximately one wave is generated in the straight portions used for driving.

Besides this, the task can be achieved if the piezo-electric element is disposed so that irrespective of the number of waves over the full circumference, approximately one wave may be generated in the straight portions used for driving.

In the above-described embodiment, the vibration member is moved and the stator 8 which is a portion of the printer is fixed in place, but alternatively, the vibration member may be fixed in place and the stator 8 may be moved to obtain a similar effect.

As described above, according to the present invention, such a travelling vibration wave that approximately one wave is created in the straight portions of the vibration member used for driving is generated and the vibration member and the member with which the vibration member is brought into pressure contact are always brought into contact with each other at the antinode of one wave without separating from each other. Thus the efficiency of the motor can be enhanced and noise can be prevented.

We claim:

1. A vibration wave driven apparatus comprising:
    a vibration member having an oval shape formed by straight portions and arcuate portions;
    a contact member having a surface which contacts said vibration member; and
    an electro-mechanical energy conversion member having two driving elements and provided on said vibration member for generating a travelling vibration wave in said vibration member in response to an electrical signal applied to said elements, said two driving elements being provided on said vibration member in such a manner that only one travelling vibration wave is formed on at least one of the straight portions of said vibration member.

2. A vibration wave driven apparatus according to claim 1, wherein each of said driving elements is constructed of a first element comprising a plurality of segments and a second element comprising a plurality of segments, said first element and said second element being positionally deviated from each other and provided on said vibration member.

3. A vibration wave driven apparatus according to claim 2, wherein said first element and said second element are positionally deviated from each other and provided along one end surface of said vibration member.

4. A vibration driven apparatus according to claim 2, wherein said first element and said second element are positionally deviated by $\lambda/4$ from each other and provided along one end surface of said vibration member wherein $\lambda$ is the wavelength of the vibration wave.

5. A vibration wave driven apparatus according to claim 1, wherein each of said driving elements is constructed of a first element comprising a plurality of segments formed by polarization processing and a second element comprising a plurality of segments formed by polarization processing, said first element and said second element being positionally deviated from each other and provided on said vibration member.

6. A vibration wave driven apparatus according to claim 1, wherein when the length of said straight portions is L and the average radius of said arcuate portions is R, R/L is $\frac{1}{4}$ or more.

7. A vibration wave driven apparatus comprising:
    a vibration member having an oval shape formed by straight portions and arcuate portions;
    a contact member having a surface which contacts said vibration member; and
    an electro-mechanical energy conversion member having two driving elements and provided on said vibration member for generating a travelling vibration wave in said vibration member in response to an electrical signal applied to said elements, said two driving elements being provided on said vibration member in such a manner than only one travelling vibration wave is formed on at least one of the straight portions of said vibration member, whereby the vibration wave creates relative movement between said vibration member and said contact member.

8. A vibration wave driven apparatus according to claim 7, wherein each of said driving elements is constructed of a first element comprising a plurality of segments and a second element comprising a plurality of segments, said first element and said second element being positionally deviated from each other and provided on said vibration member.

9. A vibration wave driven apparatus according to claim 8, wherein said first element and said second element are positionally deviated from each other and provided along one end surface of said vibration member.

10. A vibration driven apparatus according to claim 8, wherein said first element and said second element are positionally deviated by $\lambda/4$ from each other and provided along one end surface of said vibration member wherein $\lambda$ is the wavelength of the vibration wave.

11. A vibration wave driven apparatus according to claim 7, wherein each of said driving elements is constructed of a first element comprising a plurality of segments formed by polarization processing and a second element comprising a plurality of segments formed by polarization processing, said first element and said second element being positionally deviated from each other and provided on said vibration member.

12. A vibration wave driven apparatus according to claim 7, wherein when the length of said straight portions is L and the average radius of said arcuate portions is R, R/L is $\frac{1}{4}$ or more.

13. A vibration wave driven printer comprising:
    a vibration member having an oval shape formed by straight portions and arcuate portions;
    a contact member having a surface which contacts said vibration member; and
    an electro-mechanical energy conversion member having two driving elements and provided on the vibration member for generating a travelling vibration wave in said vibration member in response to an electrical signal applied to said elements, said two driving elements being provided on said vibration member in such a manner than only one travelling vibration wave is formed on at least one of the straight portions of said vibration member.

14. A vibration wave driven motor comprising:
    a vibration member having an oval shape formed by straight portions and arcuate portions;
    a contact member having a surface which contacts the vibration member; and
    an electro-mechanical energy conversion member having two driving elements and provided on said vibration member for generating a travelling vibration wave in said vibration member in response to an electrical signal applied to said elements, said two driving elements being provided on said vibration member in such a manner that only one travelling vibration wave is formed on at least one of the straight portions of said vibration member, whereby the travelling vibration wave creates relative movement between said vibration member and said contact member.

15. A vibration wave driven motor comprising:
    a vibration member having an oval shape formed by straight portions and arcuate portions;

an electro-mechanical energy conversion member having two driving elements and provided on said vibration member for generating a vibration wave in said vibration member in response to an electrical signal applied to said elements, said two driving elements being provided on said vibration member in such a manner than only one vibration wave is formed on at least one of the straight portions of said vibration member, whereby the vibration wave creates relative movement between said vibration member and a contact member contacting said vibration member.

16. A vibration wave driven motor according to claim 15, wherein each of said driving elements is constructed of a first element comprising a plurality of segments and a second element comprising a plurality of segments, said first element and said second element being positionally deviated from each other and provided on said vibration member.

17. A vibration wave driven motor according to claim 16, wherein said first element and said second element are positionally deviated from each other and provided along one end surface of said vibration member.

18. A vibration wave driven motor according to claim 16, wherein said first element and said second element are positionally deviated by λ/4 from each other and provided along one end surface of said vibration member wherein λ is the wavelength of the vibration wave.

19. A vibration wave driven motor according to claim 15, wherein each of said driving elements is constructed of a first element comprising a plurality of segments formed by polarization processing and a second element comprising a plurality of segments formed by polarization processing, said first element and said second element being positionally deviated from each other and provided on said vibration member.

20. A vibration wave driven motor, comprising:
a vibration member; and
an electro-mechanical energy conversion member provided on said vibration member for generating a travelling wave in said vibration member in response to an applied electrical signal, said conversion member being provided on said vibration member in such a manner that only one travelling wave is formed on said vibration member, whereby said travelling wave creates relative movement between said vibration member and a contact member contacting said vibration member.

21. A vibration wave driven motor comprising:
(a) a vibration member of a shape formed by a straight portion and an arcuate portion; and
(b) an electro-mechanical energy conversion member having two driving elements and provided on said vibration member for generating a vibration wave in said vibration member in response to an electrical signal applied to the elements, said two driving elements being provided on said vibration member in such a manner that only one vibration wave is formed on at least the straight portion of said vibration member, whereby the vibration wave creates relative movement between said vibration member and a contact member contacting said vibration member.

22. A vibration wave driven motor, comprising:
an electro-mechanical energy conversion member having a plurality of segments to generate only one vibration wave therein in response to an electrical signal applied to said segments, whereby the vibration wave creates relative movement between said conversion member and a contact member contacting said conversion member.

* * * * *

UNITED STATES PATENT AND TRADEMARK OFFICE
CERTIFICATE OF CORRECTION

PATENT NO. : 5,155,407
DATED : October 13, 1992
INVENTOR(S) : KIMURA ET AL.

It is certified that error appears in the above-indentified patent and that said Letters Patent is hereby corrected as shown below:

COLUMN 3

Line 33, "nule-" should read --nucle- --.
    Line 55, "segment" should read --segments--.

COLUMN 5

Line 40, "vibration driven apparatus" should read --vibration wave driven apparatus--.

COLUMN 6

Line 18, "vibration driven apparatus" should read --vibration wave driven apparatus--.

Signed and Sealed this

Fourteenth Day of December, 1993

Attest:

BRUCE LEHMAN

*Attesting Officer*    *Commissioner of Patents and Trademarks*